United States Patent
Tanaka et al.

(10) Patent No.: US 10,619,233 B2
(45) Date of Patent: Apr. 14, 2020

(54) NICKEL-BASED ALLOY REGENERATED MEMBER, AND METHOD FOR MANUFACTURING SAME

(71) Applicant: MITSUBISHI HITACHI POWER SYSTEMS, LTD., Yokohama (JP)

(72) Inventors: Shigeru Tanaka, Yokohama (JP); Akira Yoshinari, Yokohama (JP); Takeshi Izumi, Yokohama (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 207 days.

(21) Appl. No.: 15/824,630

(22) Filed: Nov. 28, 2017

(65) Prior Publication Data
US 2018/0148819 A1  May 31, 2018

(30) Foreign Application Priority Data

Nov. 28, 2016  (JP) .................................. 2016-229893

(51) Int. Cl.
| | |
|---|---|
| *C22F 1/10* | (2006.01) |
| *C22C 19/05* | (2006.01) |
| *F01D 5/28* | (2006.01) |
| *B23P 6/00* | (2006.01) |

(52) U.S. Cl.
CPC .............. *C22F 1/10* (2013.01); *C22C 19/051* (2013.01); *F01D 5/28* (2013.01); *B23P 6/002* (2013.01); *F05D 2230/40* (2013.01); *F05D 2230/80* (2013.01)

(58) Field of Classification Search
CPC ............. C22F 1/10; C22C 19/051; F01D 5/28
See application file for complete search history.

(56) References Cited

FOREIGN PATENT DOCUMENTS

| | | |
|---|---|---|
| CN | 104878329 A | 9/2015 |
| EP | 1605074 A1 | 12/2005 |
| EP | 1857217 A1 | 11/2007 |
| JP | 11-335802 A | 12/1999 |
| JP | 2004-012377 A | 1/2004 |
| JP | 2010-164430 A | 7/2010 |
| JP | 2014-126442 A | 7/2014 |

OTHER PUBLICATIONS

Dwarapureddy, Arvind Kumar, "Study of particle growth and breakdown in single size gamma prime distribution and high temperature creep in IN738LC nickel superalloy" (2006). LSU Master's Theses. 2631. https://digitalcommons.lsu.edu/gradschool_theses/2631.*
El-Bagoury, N., M. Waly, and A. Nofal. "Effect of various heat treatment conditions on microstructure of cast polycrystalline IN738LC alloy." Materials Science and Engineering: A 487.1-2 (2008): 152-161.*
Chinese Office Action dated Apr. 18, 2019 for the Chinese Patent Application No. 201711192695.8.
Extended European Search Report dated Apr. 25, 2018 for the European Patent Application No. 17001915.2.
Japanese Office Action dated Dec. 10, 2019 for the Japanese Patent Application No. 2016-229893.

* cited by examiner

*Primary Examiner* — Jessee R Roe
(74) *Attorney, Agent, or Firm* — Volpe and Koenig, P.C.

(57) ABSTRACT

There is provided a regenerated member of a nickel-based alloy member for use in a turbine. The nickel-based alloy member is in a used condition. The regenerated member is a nickel-based alloy cast article including a γ phase as a matrix and a γ' phase precipitating in the γ phase in a volume fraction of equal to or more than 30 vol % in an operational environment of the turbine. In a microstructure of the regenerated member, no recrystallized grains of the γ phase are present. And, when a GROD value of crystal grains of the γ phase of the used part undergone the solution/non-recrystallization heat treatment step is measured by electron back scattering diffraction analysis, the GROD value is equal to or more than 0.4° and equal to or less than 0.6°.

8 Claims, 2 Drawing Sheets

NICKEL-BASED ALLOY REGENERATED MEMBER, AND METHOD FOR MANUFACTURING SAME

CLAIM OF PRIORITY

The present application claims priority from Japanese patent application serial no. 2016-229893 filed on Nov. 28, 2016, the content of which is hereby incorporated by reference into this application.

FIELD OF THE INVENTION

The present invention relates to precipitation-strengthened nickel-based alloy members for use such as high-temperature members in turbines and, in particular, to a nickel-based alloy regenerated member and a method for manufacturing the regenerated member. The regeneration involves extending the useful service life of an alloy member creep-damaged after having operated for long hours in a high-temperature environment.

DESCRIPTION OF RELATED ART

High-temperature members for use in thermal power generation plants and aircraft turbines, such as turbine blades and rotors, are often made of precipitation-strengthened nickel (Ni)-based alloys (also referred to as nickel-based super alloys) to satisfy the mechanical properties required of them to operate in high-temperature environments.

Unfortunately, however, even such Ni-based alloy members with excellent high-temperature strength gradually deteriorate in their mechanical properties after being repeatedly exposed to the centrifugal force during operation at a high temperature and the thermal stress during start-up and shut-down operations. In particular, the creep strength of such members is most severely affected, which consumes its service life as the operation time increases. It is noted that any consumption of creep-strength life can be referred to as creep damage.

Today, in general, from the viewpoint of improving the rate of turbine utilization (i.e. avoiding the risk of halting due to an unexpected breakdown), any high-temperature member having operated for a predetermined period of time is replaced with a new one at regular inspection intervals assuming that it is creep-damaged to some extent.

Meanwhile, there is a technical trend in turbines toward higher inlet gas temperature for improving thermal efficiency. In recent years, vigorous research and development has been carried out on techniques for improving heat resistance of high-temperature members for use in turbines (e.g. addition of rare metal elements for improved high-temperature strength and solidification/crystal growth controlling techniques). Unfortunately, high-temperature members manufactured through such sophisticated techniques tend to be expensive, and the necessity of member replacement at regular inspection intervals increases turbine maintenance cost.

There is, quite naturally, a strong demand for low-cost industrial products. So, what is needed is to concurrently achieve higher performance and lower cost. Therefore, one solution under consideration is to develop a technique to increase the precision of life assessment of creep-damaged high-temperature members in order to reduce the replacement frequency of high-temperature members.

For example, JP 2010-164430 A discloses a metal material creep damage evaluation method for evaluating a degree of damage to a creep-damaged metal material. In this method, a correlation between the amount of creep strain of a test material and the crystal orientation distribution of the material is determined in advance. The crystal orientation distribution of a subject material of creep damage evaluation is measured. The measured crystal orientation distribution of the subject material is applied to the correlation between the amount of creep strain and the crystal orientation distribution to estimate the amount of creep strain of the subject material. Another correlation between the amount of strain at which the test material reaches an accelerated creep stage and creep test stress is determined in advance. The amount of strain at which the subject material reaches an accelerated creep stage is estimated from the stress loaded to the subject material and the correlation between the amount of strain at which the test material reaches an accelerated creep stage and creep test stress. The degree of damage to the subject material is evaluated by comparing the estimated amount of creep strain of the subject material with the estimated amount of strain at which the subject material reaches an accelerated creep stage.

Also, JP 2014-126442 A discloses a nickel-based superalloy degradation diagnosis method. In this method, a nickel-based superalloy is subjected to a heat treatment under conditions that satisfy a relationship defined by a predetermined formula between heat treatment temperature and heat treatment duration. Subsequently, the presence of a crystal caused by recrystallization in the nickel-based superalloy is measured.

According to JP 2010-164430 A, there can be provided a metal material creep damage evaluation method and a creep damage evaluation apparatus that allow highly accurate and stable evaluation of the appropriateness of continuous use of metal materials. According to JP 2014-126442 A, the prior art has been made based on the finding that a nickel-based superalloy that has reached its service life limit can be led to recrystallization by subjecting it to a predetermined heat treatment, and the method provided uses a simple degradation diagnosis method and allows accurate degradation diagnosis.

To further reduce turbine maintenance cost, it would be preferable to recycle creep-damaged members as regenerated members through their life extension or regeneration in addition to assessing their service life. While the techniques disclosed in JP 2010-164430 A and JP 2014-126442 A can be expected to allow simple and high-precision life assessment of Ni-based high-temperature members, no description can be found in the two as to any technique for life extension or regeneration of creep-damaged members.

SUMMARY OF THE INVENTION

In view of the foregoing, it is an objective of the present invention to provide an Ni-based alloy regenerated member that is obtained by extending the useful service life of a creep-damaged Ni-based alloy member and a method for manufacturing the regenerated member.

(I) According to one aspect of the present invention, there is provided a method for manufacturing a regenerated member of a nickel-based alloy member for use in a turbine. The nickel-based alloy member is a nickel-based alloy cast article including a γ phase as a matrix and a γ' phase precipitating in the γ phase in a volume fraction of equal to or more than 30 vol % in an operational environment of the turbine. The method includes: a solution/non-recrystallization heat treatment step of subjecting a used member to a solution/non-recrystallization heat treatment, the used member being the nickel-based alloy member having operated for a predetermined period of time in the turbine; and an aging heat treatment step of subjecting the used member having undergone the solution/non-recrystallization heat treatment to an aging heat treatment to allow the γ' phase to precipitate in the γ phase. In the solution/non-recrystallization heat treatment, the used member is held at a temperature that is equal to or higher than a temperature higher than the solvus temperature of the γ' phase by 10° C. but equal to or lower than a temperature lower than the melting temperature of the γ phase by 10° C., for a holding duration within a time range in which recrystallized grains of the γ phase do not occur. And, when a GROD (grain reference orientation deviation) value of crystal grains of the γ phase of the used part undergone the solution/non-recrystallization heat treatment step is measured by electron back scattering diffraction analysis, the GROD value is equal to or more than 0.4° and equal to or less than 0.6°.

Meanwhile, in the present invention, each of the solvus temperature of γ' phase and the melting temperature (solidus temperature) of γ phase may be assumed a calculated value based on a chemical composition of the nickel-based alloy by a thermodynamic calculation.

In the above aspect (I) of a method for manufacturing a regenerated member of a nickel-based alloy member for use in a turbine, the following modifications and changes can be made.

(i) The holding duration in the solution/non-recrystallization heat treatment step may be equal to or more than 15 minutes and equal to or less than 2 hours.

(ii) The cast article may be a unidirectional solidification article or a single-crystal solidification article.

(iii) The nickel-based alloy member may be a turbine blade.

(II) According to another aspect of the invention, there is provided a regenerated member of a nickel-based alloy member for use in a turbine. The nickel-based alloy member is in a used condition. The regenerated member is a nickel-based alloy cast article including a γ phase as a matrix and a γ' phase precipitating in the γ phase in a volume fraction of equal to or more than 30 vol % in an operational environment of the turbine. In a microstructure of the regenerated member, no recrystallized grains of the γ phase are present. And, when a GROD value of crystal grains of the γ phase of the used part undergone the solution/non-recrystallization heat treatment step is measured by electron back scattering diffraction analysis, the GROD value is equal to or more than 0.4° and equal to or less than 0.6°.

In the above aspect (II) of a regenerated member of a nickel-based alloy member for use in a turbine, the following modifications and changes can be made.

(iv) The regenerated member may have a creep life of equal to or more than 0.95 when the nickel-based alloy member has a creep life of 1 when it is in an unused condition.

(v) The cast article may be a unidirectional solidification article or a single-crystal solidification article.

(vi) The nickel-based alloy member may be a turbine blade.

Advantages of the Invention

According to the present invention, there can be provided an Ni-based alloy regenerated member that is obtained by extending the useful service life of a creep-damaged Ni-based alloy member and a method for manufacturing the regenerated member. Also, by using the regenerated member as a high-temperature member for use in turbines, turbine maintenance cost (especially the procurement cost of new high-temperature members) can be reduced.

Figure 1:
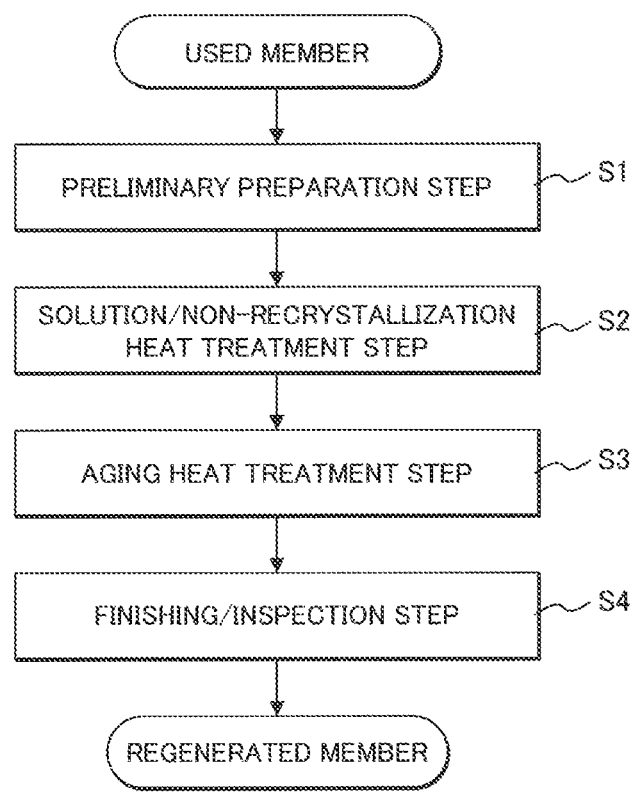
FIG. 1 is a flowchart showing an exemplary process of a method for manufacturing an Ni-based alloy regenerated member according to an embodiment of the present invention.

DETAILED DESCRIPTION OF THE PREFERRED EMBODIMENTS (Basic Idea of the Invention)

The present invention is directed toward cast articles for precipitation-strengthened Ni-based alloy members for use as high-temperature members in turbines and, in particular, toward Ni-based alloy members having a chemical composition including a γ phase as a matrix and a γ' phase as a precipitation-strengthening phase (e.g. $Ni_3Al$ phase) precipitating in the γ phase in a volume fraction of equal to or more than 30 vol % (preferably 40 to 70 vol %) and being formed of a unidirectional solidification article or a single-crystal solidification article.

The inventors carried out intensive study and research on techniques to evaluate the degree of creep damage and the influence of heat treatment on creep-damaged members with an aim to develop an Ni-based alloy regenerated member obtained by extending the useful service life of a creep-damaged Ni-based alloy member. As a result, the inventors found that there is a close relationship among the degree of creep damage, the degree of internal strain of γ phase crystal grains, and the occurrence of γ phase recrystallized grains in a heat treatment on a creep-damaged member. The inventors also found that creep life can be recovered to equal to or more than 95% by partially relaxing the internal strain of γ phase crystal grains while preventing the occurrence of γ phase recrystallized grains. The invention was made based on these findings.

EXAMPLES

Preferred embodiments of the present invention will be described hereinafter with reference to the accompanying drawings. However, it should be noted that the invention is not limited to the specific embodiments described below, and various combinations with known art and modifications based on known art are possible without departing from the spirit and scope of the invention where appropriate.

Experimental 1

(Fabrication of Alloy Member 1)

A simulation sample of a high-temperature member for turbines according to an embodiment of the invention was Prepared. First, a master ingot of an alloy 1 having a nominal chemical composition as shown in Table 1 was subjected to high-frequency melting. Subsequently, a cast plate article (200 mm long, 200 mm wide, and 10 mm thick) was fabricated by a unidirectional solidification method. The solvus temperature of the γ' phase in the alloy 1 is approximately 1,190° C.

TABLE 1

Nominal Chemical Composition of Alloy 1.

(Unit: mass %)

| | Ni | Cr | Co | Mo | Ti | Nb | Al | W | Ta | C |
|---|---|---|---|---|---|---|---|---|---|---|
| Alloy 1 | Bal. | 13.8 | 6.7 | 1.7 | 3.3 | 1.1 | 3.9 | 4.0 | 2.8 | 0.1 |

"Bal." includes inevitable impurities.

The cast plate article prepared above was subjected to a solution heat treatment (held at 1,210° C. for two hours and then rapidly cooled under a vacuum), a 1st step aging heat treatment (held at 1,100° C. for four hours and rapidly cooled under a vacuum), and a 2nd step aging heat treatment (held at 850° C. for ten hours and then rapidly cooled under a vacuum) in succession to fabricate a simulation sample of a high-temperature member for turbines (Alloy Member 1).

Experimental 2

(Preparation of Used Member Samples, and Evaluation of Degree of Creep Damage and Internal Strain of γ Phase Crystal Grains)

From Alloy Member 1, a plurality of creep test pieces (9 mm in diameter and 100 mm in length) were taken such that the unidirectional solidification direction was the longitudinal direction. Subsequently, each of the creep test pieces was subjected to a creep test (900° C., 245 MPa).

In one test, the creep life ($t_v$) of a test piece as a sample of a virgin member was measured, and it was found to be approximately 950 hours. In other tests, each creep test piece was taken out when it reached a predetermined amount of creep strain (a strain of 0.8 to 3%) to serve as a sample of a used member. Also, the degree of creep damage at each predetermined amount of damage was calculated from the ratio between the time required to reach the amount of creep strain ($t_c$) and the $t_v$ ($t_c/t_v$). Note that a plurality of creep test pieces were used in each test.

The virgin member sample and the used member samples prepared above were each subjected to electron back scattering diffraction (EBSD) analysis to measure their grain reference orientation deviation (GROD) values of the γ phase crystal grains for evaluation of the internal strain of γ phase crystal grains.

A relationship among the amount of creep strain, the degree of creep damage, and the internal strain of γ phase crystal grains of each sample in this testing is represented in Table 2.

TABLE 2

Relationship between Amount of Creep Strain, Degree of Creep Damage, and GROD value.

| | Amount of Creep Strain | Degree of Creep Damage ($t_c/t_v$) | GROD Value |
|---|---|---|---|
| Virgin Member | 0% | 0 | 0.2 to 0.3° |
| Used Member | 0.8 to 1% | approximately 0.25 to 0.33 | 0.4 to 0.5° |
| | 1 to 1.5% | approximately 0.33 to 0.5 | 0.4 to 0.6° |
| | 1.5 to 2% | approximately 0.5 to 0.65 | 0.5 to 0.7° |
| | 2 to 2.5% | approximately 0.65 to 0.7 | 0.6 to 0.8° |
| | 2.5 to 3% | approximately 0.7 to 0.9 | 0.8 to 1° |

As shown in Table 2, a good correlation is observed between the amount of creep strain and the degree of creep damage. It is also observed that the GROD value tends to increase as the amount of creep strain and the degree of creep damage increase. However, because the measured GROD values have relatively large fluctuation, it is deemed difficult to unambiguously estimate the degree of creep damage from a GROD value.

Experimental 3

(Fabrication of Regenerated Member Sample, Study of Occurrence Behavior of γ Phase Recrystallized Grains, and Study of Creep Life of Regenerated Member)

Each of the used member samples prepared in Experimental 2 was subjected to a solution heat treatment (held at 1,200° C. for two hours and then rapidly cooled under a vacuum) as a simulated life extension/regeneration treatment. Subsequently, the metallographic structure (microstructure) of each sample was observed.

le;.5qThe results showed that no particular change in microstructure was observed in the samples with a creep strain amount of equal to or less than 1.2%. In contrast, in the samples with a creep strain amount of 1.3 to 1.5%, occurrence of γ phase recrystallized grains was observed, and it was also observed that the number and size of the γ phase recrystallized grains increased as the amount of creep strain increased. Occurrence of γ phase recrystallized grains was also observed in the samples with a creep strain amount of over 1.5%, but its degree was about the same as that in the samples with a creep strain amount of 1.5%, which made it difficult to find any clear difference between the two.

Next, each sample, which had undergone the solution heat treatment, was subjected to the 1st step aging heat treatment and the 2nd step aging heat treatment the same as those in Experimental 1 to fabricate a regenerated member sample. The regenerated member samples thus obtained were each subjected to a creep test in the same manner as Experiment 2 to measure the creep life ($t_r$) of each regenerated member sample. Also, the ratio between the $t_r$ of the regenerated member sample and the $t_v$ of the virgin member sample ($t_r/t_v$) was determined as the degree of regeneration. The results are shown in Table 3.

TABLE 3

Relationship between Amount of Creep Strain of Creep Damaged Member and Degree of Regeneration of Regenerated Member.

| Amount of Creep Strain of Creep Damaged Member | Degree of Regeneration of Regenerated Member ($t_r/t_v$) |
|---|---|
| 0.8% | 1.0 |
| 1% | 1.0 |

TABLE 3-continued

Relationship between Amount of Creep Strain of Creep Damaged Member and Degree of Regeneration of Regenerated Member.

| Amount of Creep Strain of Creep Damaged Member | Degree of Regeneration of Regenerated Member ($t_r/t_v$) |
|---|---|
| 1.2% | 0.95 |
| 1.3% | 0.72 |
| 1.4% | 0.29 |
| 1.5% | 0.10 |
| 2% | 0.09 |
| 2.5% | 0.09 |
| 3% | 0.08 |

As shown in Table 3, it is observed that the creep life of the samples with a creep strain amount of equal to or less than 1.2%, in which no particular change in microstructure had been observed after the solution heat treatment, is successfully extended to a degree of regeneration of equal to or more than 0.95 by the heat treatments described above. In contrast, it turns out that the degree of regeneration of the samples with a creep strain amount of equal to or more than 1.3% (i.e. the samples in which γ phase recrystallized grains had occurred due to the solution heat treatment) is insufficient. As for the samples with a creep strain amount of equal to or more than 1.4%, in particular, the creep life of the regenerated part $t_r$ is below the original remaining creep life ($t_v - t_c$). In other words, it is found that the creep life is shortened by the solution heat treatment.

Next, preferable conditions of the solution heat treatment were studied for the samples with a creep strain amount of equal to or more than 1.5% (with a degree of creep damage of equal to or more than 0.5). Specifically, regenerated member samples were fabricated under the same conditions as above except for the holding duration in the solution heat treatment, and the degree of regeneration was studied. The results are shown in Table 4.

TABLE 4

Relationship between Holding Duration of Solution Heat Treatment and Degree of Regeneration of Regenerated Member.

| | Degree of Regeneration of Regenerated Member ($t_r/t_v$) | | | |
|---|---|---|---|---|
| Amount of Creep Strain of Creep Damaged Member | Holding Duration of 2 Hours | Holding Duration of 1 Hours | Holding Duration of 30 Minutes | Holding Duration of 15 Minutes |
| 1.5% | 0.10 | 1.0 | 0.98 | 0.95 |
| 2% | 0.09 | 0.10 | 0.98 | — |
| 2.5% | 0.09 | — | 0.11 | 0.95 |
| 3% | 0.08 | — | — | 0.15 |

Symbol "—" indicates that measurement was not performed.

The results shown in Table 4 are surprising. Even with the samples with a creep strain amount of equal to or more than 1.5%, with which life extension/regeneration was difficult by the above-described solution heat treatment (held at 1,200° C. for two hours under a vacuum and then rapidly cooled), life extension/regeneration is achieved to a degree of regeneration of equal to or more than 0.95 by shortening the holding duration of the solution heat treatment.

Specifically, life extension/regeneration is achieved to a degree of regeneration of equal to or more than 0.95 when the holding duration for the samples with a creep strain amount of 1.5% (the samples with a degree of creep damage of equal to or more than 0.5) is set at one hour; the holding duration for the samples with a creep strain amount of 2% (the samples with a degree of creep damage of 0.65) is set at 30 minutes; and the holding duration for the samples with a creep strain amount of 2.5% (the samples with a degree of creep damage of 0.7) is set at 15 minutes. As for the samples with a creep strain amount of over 2.5% (the samples with a degree of creep damage of over 0.7), however, creep life extension/regeneration is difficult by shortening the holding duration of the solution heat treatment.

The microstructure observation of the samples regenerated to a degree of regeneration of equal to or more than 0.95 revealed that no γ phase recrystallized grains had occurred in each sample. Also, the measurement of the GROD values of the γ phase crystal grains in the samples regenerated to a degree of regeneration of equal to or more than 0.95 by EBSD analysis revealed that each sample had a GROD value within a range of 0.4 to 0.6°, which indicates that the internal strain of γ phase crystal grains has been partially relaxed.

Meanwhile, the measurement of the GROD values of the γ phase crystal grains in the samples in which recrystallized grains had occurred by the solution heat treatment revealed that their GROD values ranged from 0.2 to 0.4°. This suggests the presence of γ phase crystal grains whose internal strain has been fully relaxed.

The mechanism behind the results shown in Tables 3 and 4 is not clarified yet, but it may be explained by the following model.

It can be said that creep strain is accumulated as internal strain of crystal grains. The internal strain of crystal grains tries to relax itself during a solution heat treatment (i.e. it takes to work itself as a driving force for recrystallization to occur). Furthermore, since the occurrence of recrystallization here is thought to be a kind of homogeneous nucleation, it can be considered that it has a higher potential barrier than that of heterogeneous nucleation and requires a larger driving force (i.e. the nucleation frequency is low).

The results shown in Tables 3 and 4 indicate that recrystallized grains are more likely to occur in the samples with larger creep strain and in a shorter period of time in the heat treatment, which can roughly be explained by this model. Also, it is thought that the creep life of the samples in which recrystallization has occurred is short after regeneration because occurrence of recrystallized grains, which leads to formation of new grain boundaries, is not desirable in a unidirectional solidification article or a single-crystal solidification article from the viewpoint of creep properties.

From the series of experimentals, an important technical finding was made that in order to regenerate a creep damaged Ni-based alloy member, it is crucial to perform a solution/non-recrystallization heat treatment that partially relaxes the internal strain of the γ phase crystal grains while preventing occurrence of γ phase recrystallized grains in a solution heat treatment to dissolve the γ' phase of the creep damaged member in solid solution. From the viewpoint of relaxing the internal strain of the γ phase crystal grains, it is believed that the heat treatment should preferably be performed as long as possible within a time range in which recrystallization does not occur.

Also, from the results shown in Table 4, it is found that a degree of creep damage of equal to or more than 0.5 can be determined more clearly than with conventional techniques, based on the holding duration of the solution heat treatment performed on a creep damaged member at which γ phase recrystallized grains start to occur, even for alloy members that are expected to have a degree of creep damage of equal to or more than 0.5 but whose amounts of creep strain are difficult to directly measure (e.g. members having complicated shapes and members whose amounts of creep strain vary depending on the portions therein). This can be used as a technique/method for evaluating a degree of creep damage.

Experimental 4

(Reproducibility Verification Experiment Using Alloy Members Formed of Alloys 2 and 3)

Alloy members 2 and 3 were fabricated from alloys 2 and 3 having the nominal chemical compositions shown in Table 5 below and subjected to the same experiments as Experimentals 2 and 3 except that the temperature of the solution heat treatment for regeneration was set at 1,250° C. The results obtained were similar to those above.

In other words, it is confirmed that in order to regenerate a creep damaged Ni-based alloy member, it is crucial to perform a solution/non-recrystallization heat treatment that partially relaxes the internal strain of the γ phase crystal grains while preventing occurrence of γ phase recrystallized grains in a solution heat treatment to dissolve the γ' phase of the creep damaged member in solid solution.

TABLE 5

Nominal Chemical Compositions of Alloys 2 and 3.

(Unit: mass %)

| | Ni | Cr | Co | Mo | Ti | Al | W | Ta | C |
|---|---|---|---|---|---|---|---|---|---|
| Alloy 2 | Bal. | 14.0 | 9.5 | 1.5 | 4.9 | 3.0 | 3.8 | 2.8 | 0.1 |
| Alloy 3 | Bal. | 14.0 | 10.0 | 1.5 | 3.0 | 4.0 | 4.0 | 5.0 | 0.1 |

"Bal." includes inevitable impurities.

Note that although Experimentals 1 to 4 were conducted on unidirectional solidification articles, the present invention is also applicable to single-crystal solidification articles.

[Method for Manufacturing Regenerated Member]

Based on the findings made by Experimentals 1 to 4 above, a method for manufacturing an Ni-based alloy regenerated member according to an embodiment of the invention will hereinafter be described.

FIG. 1 is a flowchart showing an exemplary process of a method for manufacturing an Ni-based alloy regenerated member according to an embodiment of the invention. As shown in FIG. 1, first, a preliminary preparation step (Step 1: S1) is conducted. In this step, an Ni-based alloy used member having operated in a turbine for a predetermined period of time is visually inspected for flaws that cannot be repaired with the invention (e.g. cracks and chipping). In the present invention, if such flaws are detected on the member, the member is not subjected to the following steps. Also, when the used member is coated with a thermal barrier coating (TBC), removal of the TBC is also included in the preliminary preparation step. The removal of the TBC is not essential, but it is preferable that it be performed.

Next, a solution/non-recrystallization heat treatment step (STEP 2: S2) is conducted. In this step, the used member having undergone the preliminary preparation step S1 is subjected to a solution/non-recrystallization heat treatment. In the solution/non-recrystallization heat treatment, the used member is held at a temperature that is equal to or higher than a temperature higher than the solvus temperature of the γ' phase by 10° C. but equal to or lower than a temperature lower than the melting temperature of the γ phase by 10° C. for a period of time within a time range in which γ phase recrystallized grains do not occur. As mentioned before, the largest feature of the present invention lies in this solution/non-recrystallization heat treatment step S2.

The temperature of the solution/non-recrystallization heat treatment is set to be equal to or higher than a temperature higher than the solvus temperature of the γ' phase by 10° C. in order to fully dissolve the γ' phase in solid solution into the γ phase. Also, the temperature of the heat treatment is set to be equal to or lower than a temperature lower than the melting temperature of the γ phase by 10° C. in order to prevent undesired deformation of the used member during the heat treatment. From the viewpoint of preventing occurrence of γ phase recrystallized grains, the upper limit temperature of the heat treatment is preferably set to be equal to or lower than a temperature lower than the melting temperature of the γ phase by 20° C. The reason why the holding duration of the heat treatment is set to be within a time range in which γ phase recrystallized grains do not occur is as described in Experimental 3 above.

Now, how to find out the holding duration with which γ phase recrystallized grains do not occur will briefly be described. If the Ni-based alloy member for use in turbines is a turbine blade, for example, it is considered that a plurality of used members, i.e. used turbine blades, occur at a regular inspection, and they are similarly creep-damaged.

In such a case, a plurality of test pieces for a solution/non-recrystallization heat treatment are taken from one of the used members. Then, using these test pieces, a solution/non-recrystallization heat treatment test is conducted with the holding duration as a parameter. The appropriate holding duration can be determined through microstructure observation of the test pieces.

Also, it is preferable that the GROD values of the γ phase crystal grains in the test pieces having undergone the solution/non-recrystallization heat treatment test be measured by EBSD analysis. Measuring the GROD values makes it possible to confirm that the internal strain of the γ phase crystal grains has been partially relaxed, thereby allowing quality check of the regenerated member in advance. Note that the measurement of the GROD values (i.e. the confirmation of partial relaxation of the internal strain of the γ phase crystal grains) may be conducted after the aging heat treatment described below.

After the appropriate holding duration in the solution/non-recrystallization heat treatment is determined, the solution/non-recrystallization heat treatment is performed on the other used members.

Next, the used members having undergone the solution/non-recrystallization heat treatment step S2 are subjected to an aging heat treatment step (Step 3: S3). In this step, an aging heat treatment is performed to allow the γ' phase to precipitate in the γ phase. As this aging heat treatment, the same aging heat treatment as that performed in the manufacturing of a virgin member of the alloy member may preferably be employed.

Subsequently, the used members having undergone the aging heat treatment step S3 are subjected to a finishing/inspection step (Step 4: S4). In this step, finishing work and visual inspection are conducted to finish them as regenerated members. This step is not essential, but it is preferable that it be performed. The finishing work includes shape correction and TBC application, where appropriate.

Through the steps above, Ni-based alloy regenerated members can be obtained.

[Ni-Based Alloy Regenerated Member]

Figure 2:
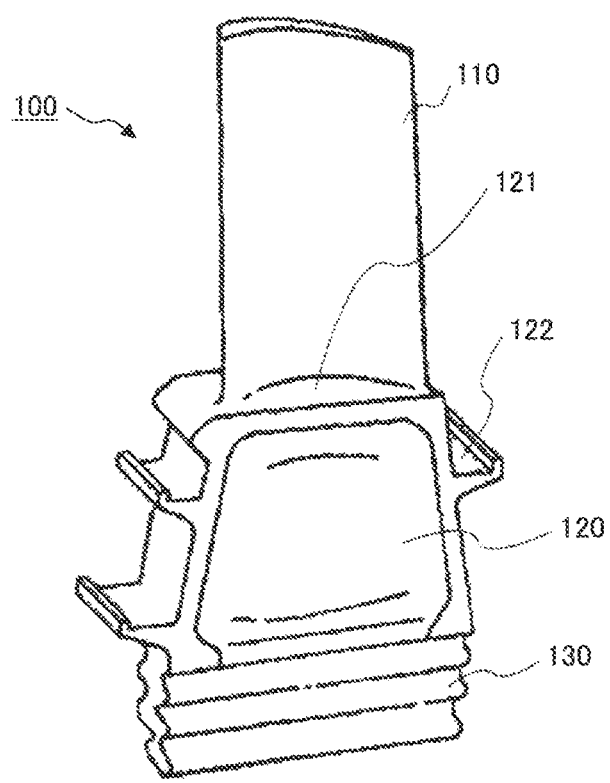
FIG. 2 is a schematic illustration showing a perspective view of an exemplary turbine rotor blade as an Ni-based alloy regenerated member according to an embodiment of the present invention.

FIG. 2 is a schematic illustration showing a perspective view of an exemplary turbine rotor blade as an Ni-based alloy regenerated member according to an embodiment of the invention. As shown in FIG. 2, the turbine rotor blade 100 includes, roughly, an airfoil 110, a shank 120, and a root (also referred to as dovetail) 130. The shank 120 is provided with a platform 121 and radial fins 122. In the case of a gas turbine, the size of the turbine rotor blade 100 (the longitudinal length in the figure) is normally 5 to 50 cm.

The invention is not limited to the above described embodiments, and various modifications can be made. Also, the above embodiments are given for the purpose of detailed illustration and explanation only, and the invention is not intended to include all features and aspects of the embodiments described above. Also, a part of an embodiment may be replaced by known art, or added with known art. That is, a part of an embodiment of the invention may be combined with known art and modified based on known art.

What is claimed is:

1. A method for manufacturing a regenerated member of a nickel-based alloy member for use in a turbine, the nickel-based alloy member being a nickel-based alloy cast article comprising a γ phase as a matrix and a γ' phase as a precipitation-strengthening phase precipitating in the γ phase in a volume fraction of equal to or more than 30 vol % in an operational environment of the turbine, the method comprising:

a solution/non-recrystallization heat treatment step in order to partially relax internal strain of the γ phase of subjecting a used member to a solution/non-recrystallization heat treatment under a vacuum in which the used member is held at a temperature that is equal to or higher than a temperature higher than the solvus temperature of the γ' phase by 10° C. and equal to or lower than a temperature lower than the melting temperature of the γ phase by 10° C. for a holding duration within a time range in which recrystallized grains of the γ phase do not occur, the used member being the nickel-based alloy member having operated for a predetermined period of time in the turbine; and an aging heat treatment step of subjecting the used member having undergone the solution/non-recrystallization heat treatment to an aging heat treatment to allow the γ' phase to precipitate in the γ phase, wherein when a GROD (grain reference orientation deviation) value of crystal grains of the γ phase of the used part undergone the solution/non-recrystallization heat treatment step is measured by electron back scattering diffraction analysis, the GROD value is equal to or more than 0.4° and equal to or less than 0.6°.

2. The method for manufacturing a regenerated member of a nickel-based alloy member for use in a turbine according to claim 1, wherein the nickel-based alloy member is a turbine blade.

3. The method for manufacturing a regenerated member of a nickel-based alloy member for use in a turbine according to claim 1, wherein the cast article is a unidirectional solidification article or a single-crystal solidification article.

4. The method for manufacturing a regenerated member of a nickel-based alloy member for use in a turbine according to claim 3, wherein the nickel-based alloy member is a turbine blade.

5. The method for manufacturing a regenerated member of a nickel-based alloy member for use in a turbine according to claim 1, wherein the holding duration in the solution/non-recrystallization heat treatment step is equal to or more than 15 minutes and equal to or less than 2 hours.

6. The method for manufacturing a regenerated member of a nickel-based alloy member for use in a turbine according to claim 5, wherein the cast article is a unidirectional solidification article or a single-crystal solidification article.

7. The method for manufacturing a regenerated member of a nickel-based alloy member for use in a turbine according to claim 6, wherein the nickel-based alloy member is a turbine blade.

8. The method for manufacturing a regenerated member of a nickel-based alloy member for use in a turbine according to claim 5, wherein the nickel-based alloy member is a turbine blade.

* * * * *